US005736038A

United States Patent [19]

Stoughton

[11] Patent Number: 5,736,038

[45] Date of Patent: Apr. 7, 1998

[54] APPARATUS FOR PATIENT SAFETY PROTECTION IN A MEDICAL DEVICE WITH AN ELECTRIFIED ELEMENT

[75] Inventor: John W. Stoughton, Indianapolis, Ind.

[73] Assignee: United Medical Manufacturing Co., Indianapolis, Ind.

[21] Appl. No.: 610,539

[22] Filed: Mar. 6, 1996

[51] Int. Cl.[6] .................... H02H 9/00

[52] U.S. Cl. .................... 210/243; 174/5 R; 174/5 SG; 210/175; 604/114

[58] Field of Search .................... 210/85, 87, 97, 210/149, 175, 232, 243, 321.71; 604/113, 114, 291; 392/318; 174/5 R, 5 SB, 5 SG

[56] References Cited

U.S. PATENT DOCUMENTS

| | | | |
|---|---|---|---|
| 3,590,322 | 6/1971 | Carr. | |
| 3,633,225 | 1/1972 | Burst et al. | 174/5 R |
| 3,699,389 | 10/1972 | Holsinger. | |
| 3,809,241 | 5/1974 | Alvine | 210/87 |
| 3,924,914 | 12/1975 | Banner. | |
| 4,155,852 | 5/1979 | Fischel et al. | 210/186 |
| 4,180,460 | 12/1979 | Calari | 210/182 |
| 4,180,722 | 12/1979 | Clewans | 219/502 |
| 5,081,696 | 1/1992 | Beck | 174/5 SG |
| 5,293,844 | 3/1994 | Threatt | 174/5 R |
| 5,381,789 | 1/1995 | Marquardt | 128/202.25 |

*Primary Examiner*—John Kim
*Attorney, Agent, or Firm*—Woodard, Emhardt, Naughton, Moriarty & McNett

[57] ABSTRACT

An apparatus for patient safety protection in a medical device with a heater. A heater configuration for a medical device, such as a haemodialysis machine, is disclosed in which a shock hazard to the patient from the heater elements due to a single fault condition is eliminated. The invention comprises an insulation layer formed between the heater elements and a grounded metal plate. A single fault condition is prevented from creating a shock hazard to the patient (which is considered to be the dialyser fluid) because any break down of the insulation layer which brings the heater elements 14 into contact with the grounded metal plate will result in a large current flowing to ground (rather than to the patient), thereby causing a fuse in the circuit to trip. Tripping of the fuse removes power from the heating elements, thereby preventing any further possibility of contact between the live electrical heater element and the dialyser fluid (i.e. the patient). Both the insulation layer and the ground connection to the grounded metal plate would have to fail (a double fault condition) in order to present a shock hazard to the patient.

27 Claims, 2 Drawing Sheets

APPARATUS FOR PATIENT SAFETY PROTECTION IN A MEDICAL DEVICE WITH AN ELECTRIFIED ELEMENT

TECHNICAL FIELD OF THE INVENTION

The present invention generally relates to medical devices and, more particularly, to an apparatus for patient safety protection in a medical device with an electrified element.

BACKGROUND OF THE INVENTION

Devices containing electrical systems are subject to various mandatory and voluntary requirements for performance and user safety. Such safety requirements are particularly important in the case of medical equipment which comes into contact with a patient, such safety requirements acting to reduce or eliminate any shock hazard to the patient. International safety standards are promulgated by the International Electrotechnical Commission (IEC), with the corresponding U.S. safety standards being implemented by Underwriter's Laboratories (UL).

In order to minimize or eliminate any shock hazard to the patient when using electrified medical equipment, UL 2601 (which implements IEC 601 in the United States) prescribes rather strict insulation requirements for insulation between live (electrified) parts and the patient. In the case of haemodialysis equipment, IEC 601-2-016 defines the dialyser fluid in the haemodialysis equipment to be the patient. Referring to FIG. 1, a portion of a prior art haemodialysis machine is illustrated and indicated generally at 10. The portion 10 of the haemodialysis machine illustrated in FIG. 1 is used to heat the dialyser fluid 12. The heater elements 14, which may be mounted on a kapton 16 are, by IEC definition, the live part. Alternatively, heater 14 may be a single heater element, such as a serpentine heating element. The heat generated by the heater elements 14 are evenly diffused to the dialyser fluid 12 by means of a metallic heat spreader 18 which is in electrical contact with the dialyser fluid 12. In order to prevent electrical contact between the electrified heater elements 14 and the conductive heat spreader 18 (and therefore the patient through the dialyser fluid 12) a silicone insulation layer 20 is formed between the heater elements 14 and the heat spreader 18.

Under UL 2601 and IEC 601-2-16, the live electrical parts of the equipment must not be coupled to the patient under a single fault condition. FIG. 2 illustrates the IEC and UL algorithm for single fault condition safety of haemodialysis equipment. In block 30, the equipment is operating in normal condition. That is, all of the means provided in the equipment for preventing a shock hazard to the patient are operational and intact. At step 32, a single fault condition occurs in the equipment. This is a condition in which a single means for protection against shock hazard in the equipment is defective or a single abnormal hazardous condition is present within the equipment. At step 34, a protective system should be operational within the equipment in order to protect the patient from the single fault condition which occurred at step 32. Such a protective system comprises an automatic system which senses a specific parameter (or parameters), or a constructional feature which is specifically designed to protect the patient against any shock hazards which may arise. If the protective system is viable, then at step 36 the protective system indicates the single fault condition to the user and prevents shock hazards to the patient by achieving a safe condition. Therefore, patient safety under a single fault condition is achieved at step 38. If, however, the protective system of step 34 has failed, then step 40 mandates that failure of the protective system must not cause a hazard to the patient. Additionally, step 42 mandates that failure of the protective system must be indicated to the user. Step 44 requires that there therefore be no hazard to the patient unless a double fault condition occurs. As pointed out at step 46, the probability of two independent faults occurring at the same time (i.e. a double fault condition) is remote, therefore patient safety under the single fault condition is achieved once again at step 38.

The prior art haemodialysis machine of FIG. 1 obviously does not meet the single fault condition protection requirements of FIG. 2. The protective system of step 34 comprises the insulation layer 20. The insulation layer 20 is the only structure in the portion 10 which prevents contact between the live electrical heater elements 14 and the dialyser fluid 12 (i.e. the patient). Failure of the insulation layer 20 results in the live heater elements 14 coming into contact with the dialyser fluid 12. By IEC definition, the patient (i.e. dialyser fluid 12) is at ground potential. Therefore, a single fault condition will produce a shock hazard in the prior art haemodialysis equipment of FIG. 1. This is a significant concern since the heater element 14 typically exhibits a voltage swing of approximately 300 $V_{P-P}$.

There is therefore a need in the prior art for a haemodialysis machine which includes a heater for the dialyser fluid which protects against a patient shock hazard in the case of a single fault condition. The present invention is directed toward meeting this need.

SUMMARY OF THE INVENTION

The present invention relates to an apparatus for patient safety protection in a medical device with a heater. A heater configuration for a medical device, such as a haemodialysis machine, is disclosed in which a shock hazard to the patient from the heater elements due to a single fault condition is eliminated. The invention comprises an insulation layer formed between the heater elements and a grounded metal plate. A single fault condition is prevented from creating a shock hazard to the patient (which is considered to be the dialyser fluid) because any break down of the insulation layer which brings the heater elements 14 into contact with the grounded metal plate will result in a large current flowing to ground (rather than to the patient), thereby causing a fuse in the circuit to trip. Tripping of the fuse removes power from the heating elements, thereby preventing any further possibility of contact between the live electrical heater element and the dialyser fluid (i.e. the patient). Both the insulation layer and the ground connection to the grounded metal plate would have to fail (a double fault condition) in order to present a shock hazard to the patient.

In one form of the invention an apparatus for patient safety protection in a medical device with a heater is disclosed, comprising an electrically conductive layer, wherein the electrically conductive layer is grounded; and a first insulation layer disposed between the heater and the electrically conductive layer; wherein failure of the first insulation layer results in a heater current being shunted to ground by the electrically conductive layer.

In another form of the invention a haemodialysis machine is disclosed, comprising a chamber adapted to hold a quantity of dialyser fluid; a heater operative to heat the dialyser fluid; an electrically conductive layer disposed between the chamber and the heater, wherein the electrically conductive layer is grounded; and a first insulation layer disposed between the electrically conductive layer and the heater; wherein failure of the first insulation layer results in a heater current being shunted to ground by the electrically conductive layer.

In another form of the invention an apparatus for patient safety protection in a medical device having an electrified element is disclosed, comprising an electrically conductive layer, wherein the electrically conductive layer is grounded; and a first insulation layer disposed between the electrified element and the electrically conductive layer; wherein failure of the first insulation layer results in an electrified element current being shunted to ground by the electrically conductive layer.

DETAILED DESCRIPTION OF THE PREFERRED EMBODIMENTS

Figure 1:
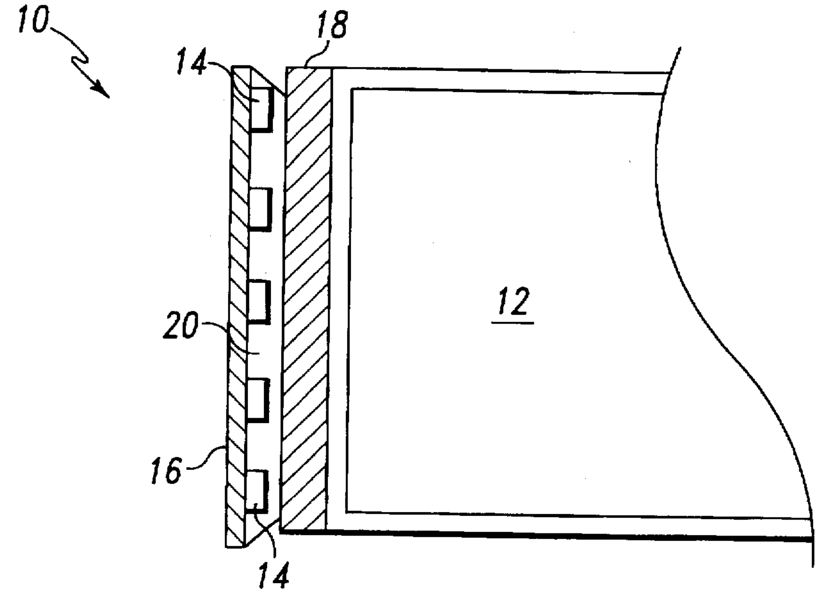
Fig. 1 (Prior Art)
FIG. 1 is a schematic cross-sectional view of a prior art haemodialysis machine, illustrating the dialyser fluid heater.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to an apparatus for patient safety protection in a medical device with a heater. A heater configuration for a medical device, such as a haemodialysis machine, is disclosed in which a shock hazard to the patient from the heater elements due to a single fault condition is eliminated. The invention comprises an insulation layer formed between the heater elements and a grounded metal plate. A single fault condition is prevented from creating a shock hazard to the patient (which is considered to be the dialyser fluid) because any break down of the insulation layer which brings the heater elements 14 into contact with the grounded metal plate will result in a large current flowing to ground (rather than to the patient), thereby causing a fuse in the circuit to trip. Tripping of the fuse removes power from the heating elements, thereby preventing any further possibility of contact between the live electrical heater element and the dialyser fluid (i.e. the patient). Both the insulation layer and the ground connection to the grounded metal plate would have to fail (a double fault condition) in order to present a shock hazard to the patient.

Figure 3:
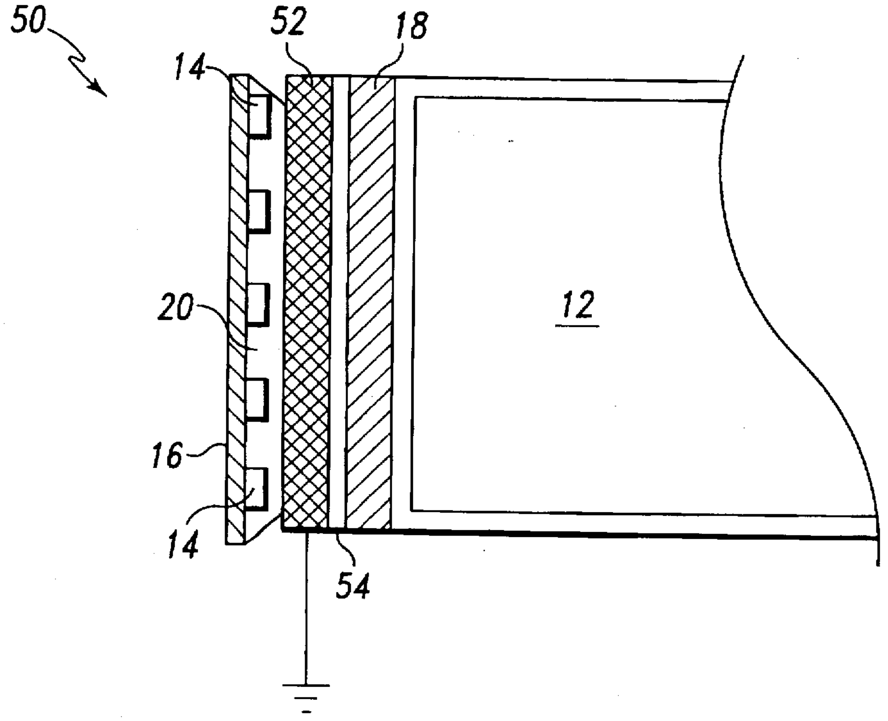
FIG. 3 is a schematic cross-sectional diagram of a haemodialysis machine of the present invention, illustrating the patient safety protection device incorporated into the heater therein.

Referring now to FIG. 3, there is illustrated a schematic cross-sectional diagram of a haemodialysis machine 50 of the present invention. Like the prior art haemodialysis machine 10 of FIG. 1, the haemodialysis machine 50 includes a plurality of heater elements 14 (or a single heater element) optionally mounted to a kapton 16. The dialyser fluid 12 is contained within a space which is optionally covered by a metallic heat spreader 18. The heater elements 14 are covered by a first insulation layer 20 such as silicone insulation, however the insulation layer 20 is not in direct contact with the heat spreader 18. Instead, the insulation of layer 20 is in contact with a grounded metal plate 52. An optional second insulation layer 54, such as silicone insulation, separates the grounded metal plate 52 from the heat spreader 18 (if any). The preferred material for the grounded metal plate 52 is copper, because it is ductile and conductive for both heat and electricity. However, the grounded metal plate 52 may also be made from other electrically and thermally conductive materials, such as aluminum, and may also be formed in a mesh configuration rather than as a solid plate. The heat spreader 18 and second insulation layer are optional to the present invention, and may be omitted entirely.

Figure 2:
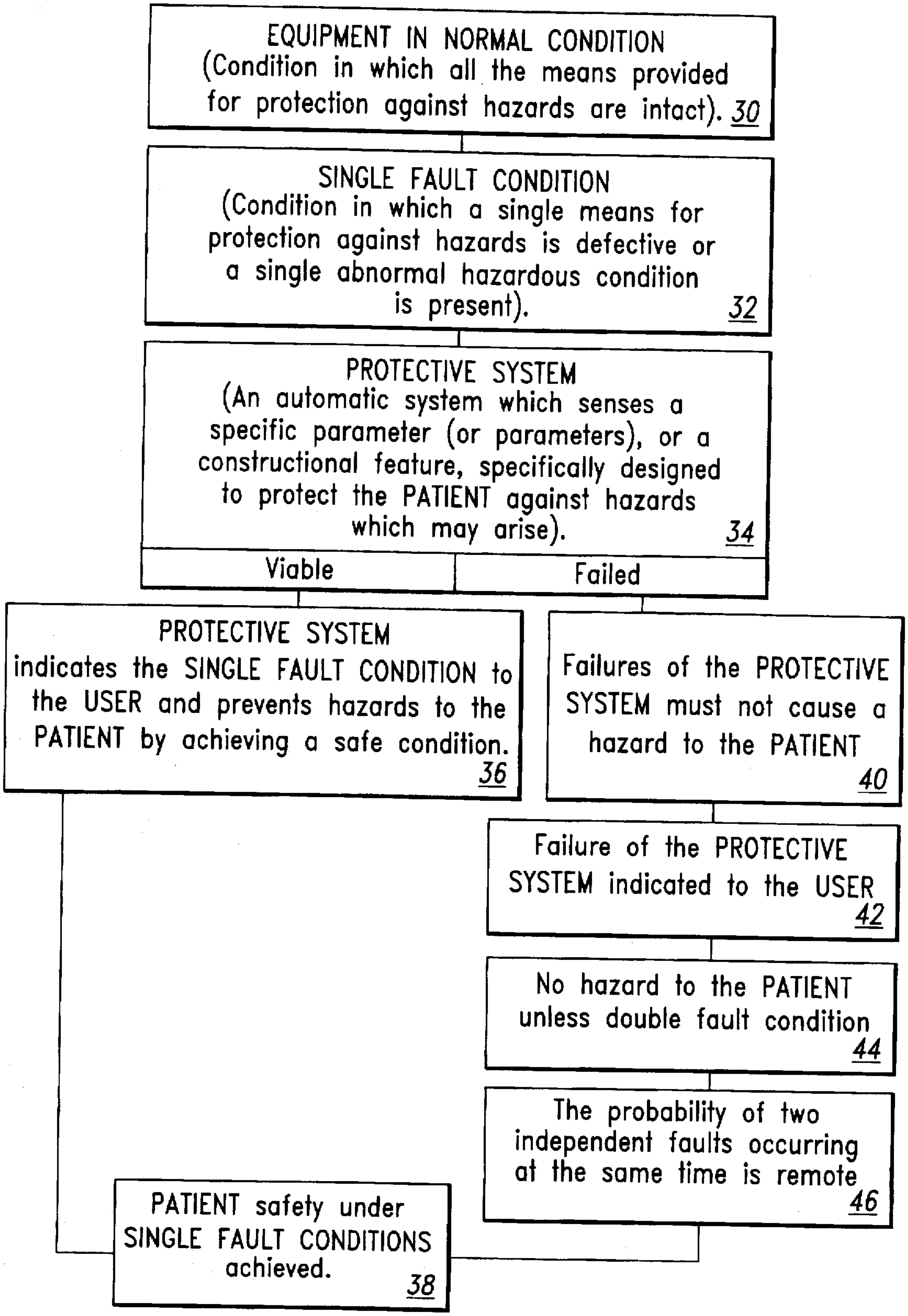
FIG. 2 is a schematic algorithm flow chart illustrating the IEC requirements for single fault condition protective systems for medical instruments.

By inclusion of the grounded plate 52 into the haemodialysis machine 50, the machine 50 is brought into compliance with the UL and IEC single fault condition safety requirements for haemodialysis equipment as illustrated in FIG. 2. Any breakdown of the first insulation layer 20 will bring the live heater elements 14 into contact with the grounded metal plate 52. The current flowing in the heater elements 14 will thereby be diverted to ground, causing a large surge in the current drawn from the power supply from the haemodialysis machine 50. A fuse (not shown) contained in the power supply will be tripped by this large surge of current flowing to ground, thereby removing the source of electrical power from the heater elements 14. The single fault condition (i.e. the breakdown of the first insulation layer 20) is thereby prevented from causing an electrical shock hazard to the patient. Rather than causing a coupling of the live heater elements 14 to the heat spreader plate 18 (and thereby to the patient or dialyser fluid 12), the current in the heater elements 14 is merely shunted to ground until it is turned off by tripping of the fuse. Even without the second insulation layer 54, the heater current will be shunted to ground through the metal plate 52 rather than through the grounded patient. This is because the ground of the metal plate 52 is a safety earth ground, preferably having less than a four volt drop while carrying 30 amperes. Because the patient would have a much higher voltage drop, the current will flow through this safety earth ground rather than through the patient.

With the haemodialysis machine 50 of FIG. 3, there is no shock hazard to the patient unless there is a double fault condition, such as the simultaneous failure of the first insulation layer 20 and the ground of the metal plate 52. Furthermore, it is common practice in prior art haemodialysis machines to incorporate an audible warning into the machine if power is removed therefrom. Therefore, tripping of the fuse by current flow through the grounded metal plate 52 will trigger such an audible alarm, thereby satisfying step 36 of the algorithm of FIG. 2, in which the protective system must indicate the single fault condition to the user. It will be appreciated by those skilled in the art that, as required by step 40 of FIG. 2, failure of the grounded metal plate 52 will in no way cause a hazard to the patient unless the first insulation layer 20 also fails (double fault condition). Furthermore, inclusion of the optional second insulation layer 54 will prevent coupling of the heater current to the patient even in the event of failure of both the first insulation layer 20 and the ground of the metal plate 52 (i.e. a double fault condition).

The haemodialysis machine 50 has two other advantages that may not be immediately obvious. The first advantage is the electrostatic shielding provided by the grounded plate 52. Leakage current in medical devices are primarily due to capacitive coupling of electrical components to the "applied part" (i.e. the part in contact with the patient). The grounded metal plate 52 of the present invention will divert any electrostatic fields generated by the heater elements 14 to ground. This will therefore eliminate any capacitive coupling of the heater elements 14 to the heat spreader 18 (and hence to the patient). The second advantage of the present invention is that the grounded metal plate 52 will, if made from a metal with a high heat conductivity such as copper, act as a heat spreader. This will help to ameliorate any hot spots that the heater grid may generate by use of individual heater elements 14.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for patient safety protection in a medical device with a heater, comprising:

a heater;

an electrically conductive layer disposed between the medical device and the heater, wherein the electrically conductive layer is grounded; and a first insulation layer disposed between the heater and the electrically conductive layer;

wherein failure of the first insulation layer results in a heater current being shunted to ground by the electrically conductive layer.

2. The apparatus of claim 1, further comprising:

a power supply operative to supply the heater current to the heater; and a fuse coupled to the power supply and operative to interrupt the heater current if the heater current exceeds a predetermined amount;

wherein the heater current exceeds the predetermined amount when the heater current is shunted to ground by the electrically conductive layer.

3. The apparatus of claim 2, further comprising:

alarm means coupled to the power supply and operative to generate an alarm when the heater current is interrupted.

4. The apparatus of claim 1, further comprising:

a second insulation layer disposed between the electrically conductive layer and the patient;

wherein the second insulation layer prevents coupling of the heater current to the patient in the event of failure of the first insulation layer and the ground of the electrically conductive layer.

5. The apparatus of claim 4, wherein the first and second insulation layers comprise silicone.

6. The apparatus of claim 4, wherein a dialyser fluid of the patient is conductively coupled to the second insulation layer.

7. The apparatus of claim 6, further comprising:

a metallic heat spreader disposed between the second insulation layer and the dialyser fluid.

8. The apparatus of claim 1, wherein the electrically conductive layer comprises a copper plate.

9. The apparatus of claim 1, wherein the medical device is a haemodialysis machine.

10. A haemodialysis machine, comprising:

a chamber adapted to hold a quantity of dialyser fluid;

a heater operative to heat the dialyser fluid;

an electrically conductive layer disposed between the chamber and the heater, wherein the electrically conductive layer is grounded; and a first insulation layer disposed between the electrically conductive layer and the heater;

wherein failure of the first insulation layer results in a heater current being shunted to ground by the electrically conductive layer.

11. The haemodialysis machine of claim 10, further comprising:

a power supply operative to supply the heater current to the heater;

a fuse coupled to the power supply and operative to interrupt the heater current if the heater current exceeds a predetermined amount;

wherein the heater current exceeds the predetermined amount when the heater current is shunted to ground by the electrically conductive layer.

12. The haemodialysis machine of claim 11, further comprising:

alarm means coupled to the power supply and operative to generate an alarm when the heater current is interrupted.

13. The haemodialysis machine of claim 10, further comprising:

a second insulation layer disposed between the electrically conductive layer and the chamber;

wherein the second insulation layer prevents coupling of the heater current to the chamber in the event of failure of the first insulation layer and the ground to the electrically conductive layer.

14. The haemodialysis machine of claim 13, wherein the first and second insulation layers comprise silicone.

15. The haemodialysis machine of claim 13, wherein the dialyser fluid is conductively coupled to the second insulation layer.

16. The haemodialysis machine of claim 10, wherein the electrically conductive layer comprises a copper plate.

17. The haemodialysis machine of claim 10, further comprising:

a metallic heat spreader disposed on a portion of the chamber.

18. An apparatus for patient safety protection in a medical device having an electrified element, comprising:

an electrified element;

an electrically conductive layer disposed between the medical device and the electrified element, wherein the electrically conductive layer is grounded; and a first insulation layer disposed between the electrified element and the electrically conductive layer;

wherein failure of the first insulation layer results in an electrified element current being shunted to ground by the electrically conductive layer.

19. The apparatus of claim 18, further comprising:

a second insulation layer disposed between the electrically conductive layer and the patient;

wherein the second insulation layer prevents coupling of the electrified element current to the patient in the event of failure of the first insulation layer and the ground of the electrically conductive layer.

20. The apparatus of claim 19, wherein the first and second insulation layers comprise silicone.

21. The apparatus of claim 19, wherein a dialyser fluid of the patient is conductively coupled to the second insulation layer.

22. The apparatus of claim 21, further comprising:

a metallic heat spreader disposed between the second insulation layer and the dialyser fluid.

23. The apparatus of claim 18, wherein the electrified element is a heater.

24. The apparatus of claim 18, further comprising:

a power supply operative to supply the current to the electrified element;

a fuse coupled to the power supply and operative to interrupt the current if the current exceeds a predetermined amount;

wherein the current exceeds the predetermined amount when the current is shunted to ground by the electrically conductive layer.

25. The apparatus of claim 24, further comprising:

alarm means coupled to the power supply and operative to generate an alarm when the current is interrupted.

26. The apparatus of claim 18, wherein the electrically conductive layer comprises a copper plate.

27. The apparatus of claim 18, wherein the medical device is a haemodialysis machine.

* * * * *

UNITED STATES PATENT AND TRADEMARK OFFICE

CERTIFICATE OF CORRECTION

PATENT NO : 5,736,038

DATED : April 7, 1998

INVENTOR(S) : John W. Stoughton

It is certified that error appears in the above-identified patent and that said Letters Patent is hereby corrected as shown below:

In column 6, line 10, please insert --and-- after "heater;"

Signed and Sealed this

Twenty-third Day of November, 1999

Attest:

Q. TODD DICKINSON

*Attesting Officer* *Acting Commissioner of Patents and Trademarks*